United States Patent
Yoshimura et al.

(10) Patent No.: US 10,477,450 B2
(45) Date of Patent: Nov. 12, 2019

(54) COMMUNICATION SYSTEM, TERMINAL APPARATUS, AND COMMUNICATION METHOD

(71) Applicant: SHARP KABUSHIKI KAISHA, Sakai, Osaka (JP)

(72) Inventors: Tomoki Yoshimura, Sakai (JP); Hiromichi Tomeba, Sakai (JP); Yasuhiro Hamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/755,091

(22) PCT Filed: Aug. 26, 2016

(86) PCT No.: PCT/JP2016/075037
§ 371 (c)(1),
(2) Date: Feb. 26, 2018

(87) PCT Pub. No.: WO2017/038703
PCT Pub. Date: Mar. 9, 2017

(65) Prior Publication Data
US 2018/0262966 A1    Sep. 13, 2018

(30) Foreign Application Priority Data
Aug. 31, 2015  (JP) .................. 2015-170060

(51) Int. Cl.
*H04W 40/04*   (2009.01)
*H04M 11/00*   (2006.01)
(Continued)

(52) U.S. Cl.
CPC .......... *H04W 40/04* (2013.01); *H04M 11/00* (2013.01); *H04W 40/02* (2013.01); *H04W 40/12* (2013.01);
(Continued)

(58) Field of Classification Search
CPC ...... H04W 40/04; H04W 76/15; H04W 76/14
See application file for complete search history.

(56) References Cited

U.S. PATENT DOCUMENTS 7,336,926 B2 *  2/2008  Noda ................. H04W 4/00
                                                         455/41.2
2015/0223099 A1  8/2015  Fujiwara et al.

FOREIGN PATENT DOCUMENTS

JP    5438637 B2       3/2014
JP    2014-082637 A    5/2014
JP    2014-225813 A    12/2014

* cited by examiner

*Primary Examiner* — Chandrahas B Patel
(74) *Attorney, Agent, or Firm* — ScienBiziP, P.C.

(57) ABSTRACT

A bi-directional communication method needs to be switched on the basis of cost of bi-directional communication. Provided is a communication system including a first terminal apparatus and a second terminal apparatus, in which the first terminal apparatus includes a radio unit that transmits a first signal by using a first communication path that is a direct communication path to the second terminal apparatus, the second terminal apparatus includes a radio unit that transmits a second signal by using a second communication path that is a communication path different from the first communication path, and the first terminal apparatus transmits the first signal on the basis of a feature amount of the second signal transmitted by the second terminal apparatus.

7 Claims, 9 Drawing Sheets

(51) Int. Cl.
*H04W 40/02* (2009.01)
*H04W 40/12* (2009.01)
*H04W 84/18* (2009.01)
*H04W 76/15* (2018.01)
*H04W 76/14* (2018.01)
*H04W 40/36* (2009.01)
*H04W 92/18* (2009.01)
*H04W 88/04* (2009.01)

(52) U.S. Cl.
CPC ........... *H04W 40/36* (2013.01); *H04W 76/14* (2018.02); *H04W 76/15* (2018.02); *H04W 84/18* (2013.01); *H04W 88/04* (2013.01); *H04W 92/18* (2013.01)

| COMMUNICATION STANDARD | COMMUNICATION SCHEME | COMMUNICATION PATH | DELAY |
|---|---|---|---|
| LTE | Any | RELAYING COMMUNICATION | T1 [ms] |
| LTE | D2D | DIRECT COMMUNICATION | T2 [ms] |
| IEEE802.11 | Any | RELAYING COMMUNICATION | T3 [ms] |
| IEEE802.11 | Ad hoc | DIRECT COMMUNICATION | T4 [ms] |
| Bluetooth | Any | DIRECT COMMUNICATION | T5 [ms] |

COMMUNICATION SYSTEM, TERMINAL APPARATUS, AND COMMUNICATION METHOD

TECHNICAL FIELD

The present invention relates to a communication system, a terminal apparatus, and a communication method.

BACKGROUND ART

Recently, a study has been made in which remote control is performed by performing communication with a remote apparatus that is connected in a radio manner. The radio connection makes it possible to start or stop an operation or give a command or the like by grasping an operation state or the like of the remote apparatus.

For example, a study has been made in which an apparatus with a radio communication function is mounted, for example, in a motor vehicle that is to run, and the apparatus is remotely controlled on the basis of a video image captured by a camera oriented in a direction in which the motor vehicle runs. As the remote control is realized, a person who controls the apparatus does not need to be in the same motor vehicle, so that efficiency of a series of operations is improved.

In the example described above, since an apparatus (remotely controlled apparatus) that is to be remotely controlled has been mounted in the motor vehicle that is running, a technique for low-delay remote control is required. In addition, the video image captured by the camera needs to be transmitted to an apparatus (a remote controlling apparatus, a remote controller, or a remote control) that the person who performs the remote control has.

That is, the following two technical requirements need to be satisfied in order to improve efficiency. First, communication from the remote controlling apparatus to the remotely controlled apparatus needs to satisfy a predetermined low-delay performance. Second, communication from the remotely controlled apparatus to the remote controlling apparatus needs to satisfy a predetermined communication capacity and further satisfy the lowest-possible-delay performance.

For example, in a case where a distance between the remote controlling apparatus and the remotely controlled apparatus is short and the apparatuses are connected to each other in a system, such as wireless LAN or Bluetooth (registered trademark), in which short-range communication is assumed, it is considered that the technical requirements described above are able to be satisfied relatively easily. However, it is reasonable to assume that the remote control is generally performed when one goes away and is difficult to perform control or when one goes away and efficiency of control is significantly reduced.

In a case where the distance between the remote controlling apparatus and the remotely controlled apparatus is long, a system with a large coverage, such as an LTE (Long Term Evolution) system whose standardization is under way in the 3GPP (Third Generation Partnership Project) or a WiMAX (registered trademark) system, is suitably used. In the LTE system, a macro cell (eNB, base station apparatus) manages a wide coverage and the remotely controlled apparatus and the remote controlling apparatus are able to perform communication via the macro cell. In the LTE system, Prose (D2D, Device to Device, direct communication, apparatus-to-apparatus communication, device-to-device communication, or the like) is prescribed, and the remote controlling apparatus and the remotely controlled apparatus perform direct communication, so that a low-delay system is realized. PTL 1 discloses an invention in which direct communication and indirect communication (relaying communication, relay, or the like) which uses a relaying station are switched on the basis of cost of the communication.

CITATION LIST

Patent Literature

PTL 1: Japanese Patent No. 5438637

SUMMARY OF INVENTION

Technical Problem

However, a method according to PTL 1 merely discloses the switching in consideration of cost of the communication only in one direction. In order to solve the aforementioned problems, a method of bi-directional communication needs to be switched on the basis of cost (low delay and a transmission capacity in the example described above) of the bi-directional communication.

Solution to Problem

In order to solve the aforementioned problems, a communication system, a terminal apparatus, and a communication method according to an aspect of the invention are provided as follows.

(1) That is, a communication system that is an aspect of the invention is a communication system including a first terminal apparatus and a second terminal apparatus, in which the first terminal apparatus includes a radio unit that transmits a first signal by using a first communication path that is a direct communication path to the second terminal apparatus, the second terminal apparatus includes a radio unit that transmits a second signal by using a second communication path that is a communication path different from the first communication path, and the first terminal apparatus transmits the first signal on a basis of a feature amount of the second signal transmitted by the second terminal apparatus.

(2) A communication system that is an aspect of the invention is the communication system according to (1), in which a required transmission rate of data transfer using the first communication path is smaller than a required transmission rate of data transfer using the second communication path.

(3) A communication system that is an aspect of the invention is the communication system according to (1), in which a required transmission delay amount of data transfer using the first communication path is smaller than a required transmission delay amount of data transfer using the second communication path.

(4) A communication system that is an aspect of the invention is the communication system according to (1), in which a frequency resource used for the first communication path is allocated in advance.

(5) A communication system that is an aspect of the invention is the communication system according to (1), in which a frequency resource used for the second communication path is allocated by transmitting a scheduling request.

(6) A terminal apparatus that is an aspect of the invention includes a first terminal apparatus that communicates with a second terminal apparatus, in which the first terminal apparatus includes a radio unit that transmits a first signal by using a first communication path that is a direct communication path to the second terminal apparatus, the first terminal apparatus receives a second signal transmitted by using a second communication path that is a communication path different from the first communication path, and the first signal is transmitted on a basis of a feature amount of the second signal.

(7) A communication method of a terminal apparatus that is an aspect of the invention is a communication method of a first terminal apparatus that communicates with a second terminal apparatus, and the communication method includes the steps of: transmitting a first signal by using a first communication path that is a direct communication path to the second terminal apparatus, receiving a second signal transmitted by using a second communication path that is a communication path different from the first communication path, and transmitting the first signal on a basis of a feature amount of the second signal.

Advantageous Effects of Invention

According to the invention, a communication system is able to constitute a suitable radio network.

DESCRIPTION OF EMBODIMENTS

[1. First Embodiment]

Figure 1:
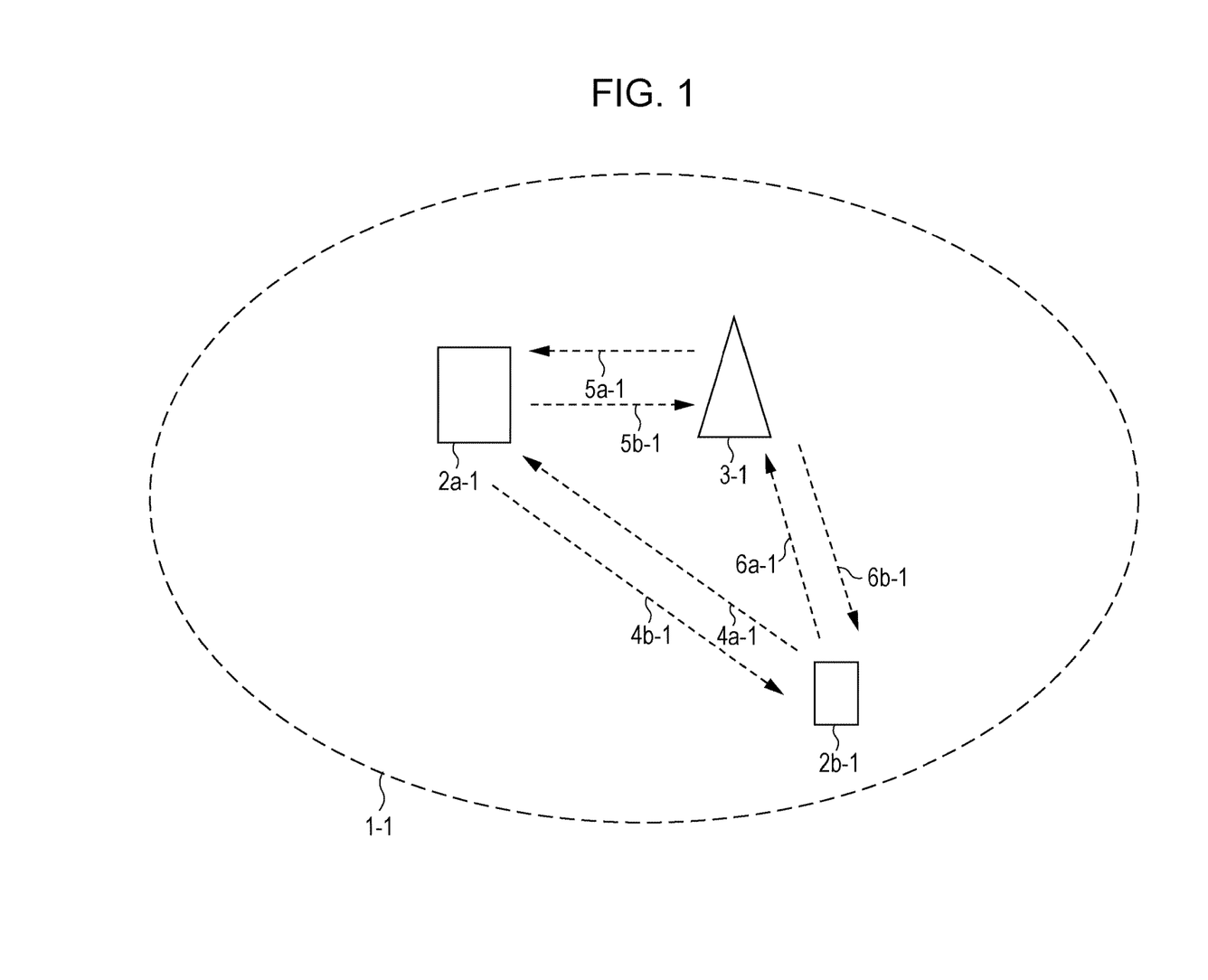
FIG. 1 illustrates an example of a configuration of a radio communication system according to an aspect of the invention.

FIG. 1 illustrates an example of a configuration of a radio communication system according to the present embodiment. A radio communication system 1-1 is configured to include a terminal apparatus 2a-1, a terminal apparatus 2b-1, and a terminal apparatus 3-1. The terminal apparatus 2a-1 and the terminal apparatus 2b-1 have a function of performing direct communications 4a-1 and 4b-1 without using a relaying apparatus (a relaying station, a relay station, a relay apparatus, an indirect communication apparatus, or the like). The direct communication is referred to also as D2D, D2D communication, line-of-sight communication, or the like. The terminal apparatus 2a-1 and the terminal apparatus 2b-1 have a function of performing relaying communications 5a-1, 5b-1, 6a-1, and 6b-1 via the relaying apparatus. The relaying communication is referred to also as indirect communication, relay communication, or the like. Note that, the terminal apparatuses 2a-1 and 2b-1 are collectively referred to also as a terminal apparatus 2-1. The direct communications 4a-1 and 4b-1 are collectively referred to also as a direct communication 4-1, the relaying communications 5a-1 and 5b-1 are referred to also as a relaying communication 5-1, and the relaying communications 6a-1 and 6b-1 are referred to also as a relaying communication 6-1.

The radio communication system 1-1 may have a coverage (a cell size, a communication available range, a connection available range, or the like) different from that of a relaying apparatus 3-1.

A relaying apparatus 4-1 may be an apparatus having a function similar to that of the terminal apparatus 2-1, may be a base station apparatus or the like (eNB, BS (Base Station)) used in an LTE (Long Term Evolution) system whose standardization is under way in the 3GPP (Third Generation Partnership Project), may be an AP (Access Point) or a STA (Station) that is used in the IEEE802.11 (wireless LAN, WLAN (Wireless LAN)) whose standardization is under way in the IEEE (Institute of Electrical and Electronics Engineers), may be an apparatus that is compatible with Bluetooth (registered trademark) or ZigBee whose standardization is under way in the IEEE802.15, or may be an apparatus that is compatible with WiMAX (registered trademark) whose standardization is under way in the IEEE802.16. The relaying apparatus 4-1 may be an apparatus that has a communication scheme other than the communication schemes described above or a communication apparatus that has a plurality of communication schemes.

The relaying apparatus 4-1 may be a small base station (a small cell, a micro-cell, a pico-cell, a femto-cell, a home eNB, or the like).

Description will be given below by assuming that the terminal apparatus 2a-1 is a remotely controlled terminal apparatus and the terminal apparatus 2b-1 is a remote controlling terminal apparatus. The terminal apparatus 2a-1 is referred to also as a remotely controlled terminal apparatus 2a-1 and the terminal apparatus 2b-1 is referred to also as a remote controlling terminal apparatus 2b-1. The remotely controlled terminal apparatus is referred to also as a remote-controlled apparatus and the remote controlling terminal apparatus is referred to also as a remote apparatus, a remote controller, a remote control, or the like.

Figure 2:
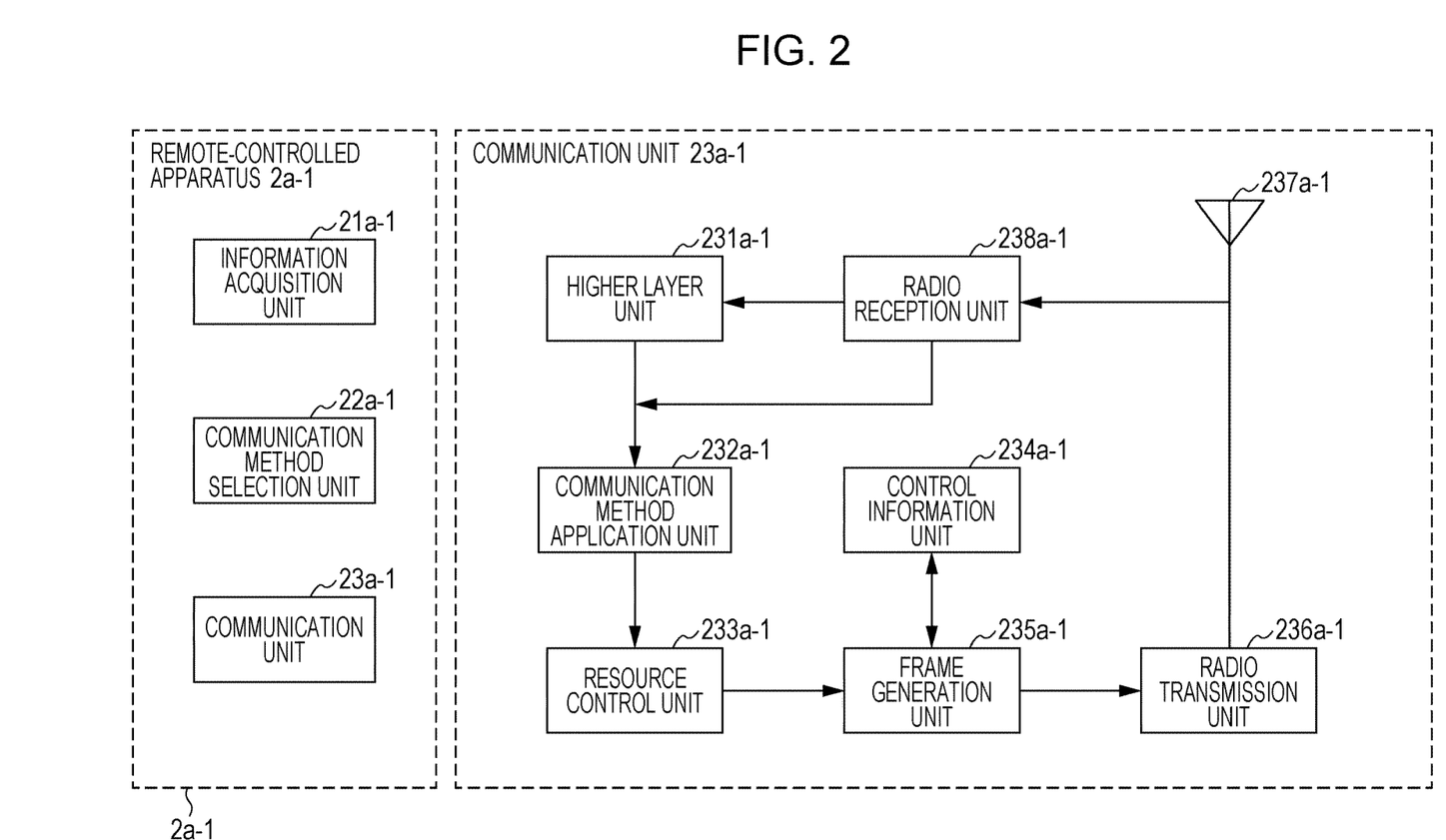
FIG. 2 illustrates an example of an apparatus configuration of a remote-controlled apparatus according to an aspect of the invention.

FIG. 2 illustrates an example of an apparatus configuration of the remote-controlled apparatus 2a-1. The remote-controlled apparatus 2a-1 is configured to include a part or all of an information acquisition unit 21a-1, a communication method selection unit 22a-1, and a communication unit 23a-1. The information acquisition unit 21a-1 processes environment information (which may be information acquired by a sensor, image information, moving image information, or other information, for example) acquired by the remote-controlled apparatus 2a-1 or an apparatus that is allowed to communicate with the remote-controlled apparatus 2a-1, and generates information about an amount of the environment information and information about properties (a requirement condition related to a communication capacity, a delay performance, connectivity, or the like) of the environment information. The information acquisition unit 21*a*-1 has a function of notifying the communication method selection unit 22*a*-1 of the information about the amount of the environment information, the information about the properties of the environment information, and a part or all of the environment information. The information acquisition unit 21*a*-1 has a function of notifying the communication unit 23*a*-1 of the information about the amount of the environment information, the information about the properties of the environment information, and a part or all of the environment information.

The communication method selection unit 22*a*-1 has a function of selecting a communication method on the basis of the information about the amount of the environment information, the information about the properties of the environment information, or the environment information, and generating information about the communication method. In a case where the remote-controlled apparatus 2*a*-1 does not include the communication method selection unit 22*a*-1, the communication method is set by using information acquired from outside, and details thereof will be described later.

The communication unit 23*a*-1 is configured to include a part or all of a higher layer unit 231*a*-1, a communication method application unit 232*a*-1, a resource control unit 232*a*-1, a frame generation unit 235*a*-1, a radio transmission unit 236*a*-1, an antenna unit 237*a*-1, and a radio reception unit 238*a*-1.

The higher layer unit 231*a*-1 is connected to a different network or an apparatus (for example, but not limited to, the information acquisition unit 21*a*-1) and has a function of acquiring information to the remote apparatus 2*b*-1. The higher layer unit 231*a*-1 also has a function of notifying the different network or the apparatus of information about remote control, which is acquired from the radio reception unit. Further, the higher layer unit 231*a*-1 has a function of notifying the communication method application unit 232*a*-1 of the information about a communication method or the environment information that is acquired from the communication method selection unit 22*a*-1 or the radio reception unit 238*a*-1.

The communication method application unit 232*a*-1 has a function of selecting a communication method on the basis of the information about the communication method and generating information (communication method information) about the selection of the communication method. The communication method application unit 232*a*-1 has a function of notifying the resource control unit 233*a*-1 of the environment information and the communication method information.

The resource control unit 233*a*-1 has a function of selecting a radio resource (also referred to as a resource or the like) used in radio communication. The radio resource is, for example, a frequency, a space, a time, a code, or the like, and the resource control unit 233*a*-1 may use different resource selection methods in accordance with the communication method information. An example of the resource selection method will be described later. The resource control unit 233*a*-1 has a function of notifying the frame generation unit 234*a*-1 of the communication method information and the environment information.

The frame generation unit 235*a*-1 has a function of generating a physical layer frame. The frame generation unit 235*a*-1 has a function of notifying the control information unit 234*a*-1 of the communication method information. The frame generation unit 235*a*-1 has a function of applying, on the basis of the communication method information, processing such as error correction coding, modulation, resource mapping, or precoding filter multiplication to the environment information or control information which is generated by the control information unit 234*a*-1 and generating a physical layer frame. The frame generation unit 235*a*-1 has a function of notifying the radio transmission unit 236*a*-1 of the physical layer frame and the communication method information.

The control information unit 234*a*-1 has a function of generating control information on the basis of the communication method information. The control information is information that is used to perform control for radio communication and is able to include, for example, information indicating an address of a transmission source, information indicating an address of a transmission destination, information about channel quality, or the like. The information included in the control information varies depending on a communication method.

The radio transmission unit 236*a*-1 has a function of generating a carrier wave signal from the physical layer frame on the basis of the communication method information. Processing performed by the radio transmission unit 236*a*-1 includes digital-analog conversion, filtering, frequency conversion from a baseband to an RF band, or the like. The radio transmission unit 237*a*-1 has a function of notifying the antenna unit 237*a*-1 of the carrier wave signal.

The antenna unit 237*a*-1 has a function of transmitting the carrier wave signal to a radio space. The antenna unit 237*a*-1 has a function of notifying the radio reception unit 238*a*-1 of the carrier wave signal received from the radio space.

The radio reception unit 238*a*-1 has a function of generating a physical layer frame from the carrier wave signal. The radio reception unit 238*a*-1 also has a function of acquiring information from the physical layer frame and notifying the higher layer unit 231*a*-1 or the communication method application unit 232*a*-1 of the information (for example, information about a communication method, communication method information, or the like). Processing performed by the radio reception unit 238*a*-1 includes frequency conversion processing, filtering, analog-digital conversion, or the like.

Figure 3:
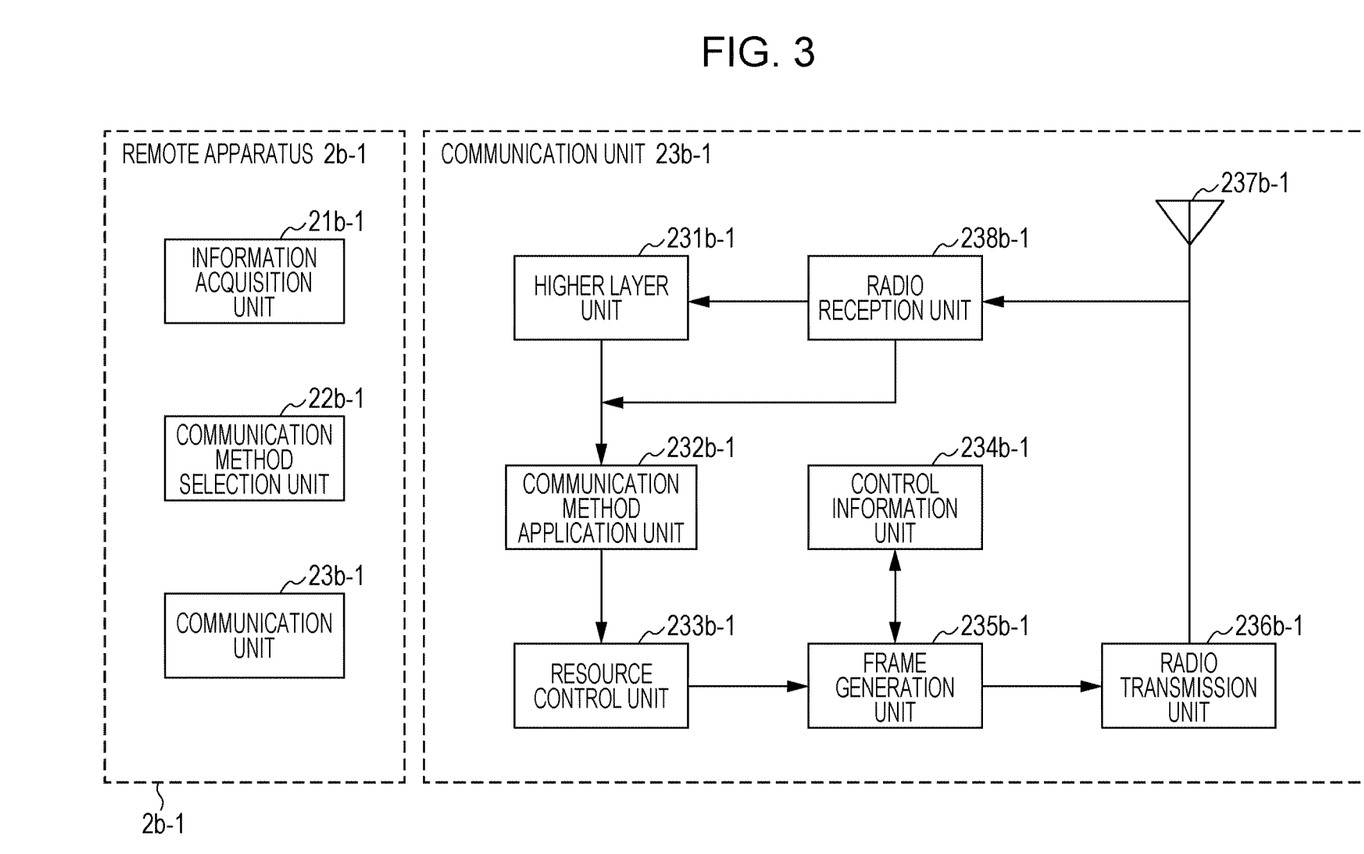
FIG. 3 illustrates an example of an apparatus configuration of a remote apparatus according to an aspect of the invention.

FIG. 3 illustrates an example of an apparatus configuration of the remote apparatus 2*b*-1. The remote apparatus 2*b*-1 is configured to include a part or all of an information acquisition unit 21*b*-1, a communication method selection unit 22*b*-1, and a communication unit 23*b*-1. The information acquisition unit 21*b*-1 acquires environment information (sensor information, moving image information, or information (remote control information, remote information, or the like) used to remotely control the remote-controlled apparatus 2*a*-1) acquired by a network or an apparatus that is connected to the remote apparatus 2*b*-1.

Note that, hereinafter, unless otherwise specified, environment information acquired by the information acquisition unit 21*b*-1 is referred to as remote control information or remote information, and environment information acquired by the information acquisition unit 21*a*-1 is referred to as environment information. The information acquisition unit 21*b*-1 has a function of generating information about a remote control information amount of the remote control information and information about properties (a requirement condition related to a communication capacity, a delay performance, connectivity, or the like) of the remote control information. The information acquisition unit 21*b*-1 has a function of notifying the communication method selection unit 22b-1 of the remote control information, the information about the amount of the remote control information, and the information about the properties of the remote control information. The information acquisition unit 21b-1 also has a function of notifying the communication unit 23b-1 of the information about the amount of the environment information, the information about the properties of the environment information, and a part or all of the environment information.

The communication method selection unit 22b-1 selects a communication method on the basis of the information about the amount of the remote control information or the information about the properties of the remote control information and generates communication method information. The communication method selection unit 22b-1 further has a function of notifying the communication unit 23b-1 of the communication method information.

The communication method selection unit 22b-1 has a function of generating communication selection instruction information that is used to assist or instruct the communication method selection unit of the remote-controlled apparatus 2a-1 to select a communication method. That is, the remote apparatus 2b-1 is able to give an instruction about a communication method used by the remote-controlled apparatus 2a-1 to perform communication. Note that, it is also possible for the remote-controlled apparatus 2a-1 to give an instruction about a communication method used by the remote apparatus 2b-1 to perform communication. That is, the remote-controlled apparatus 2a-1 may have a function similar to that of the remote apparatus 2a-1. Description will be given below by assuming that the remote apparatus 2b-1 has a function of generating communication method instruction information that is used for the remote apparatus 2b-1 to assist or instruct a communication method of the remote-controlled apparatus 2a-1, for example.

The communication unit 23b-1 is configured to include a part or all of a higher layer unit 231b-1, a communication method application unit 232b-1, a resource control unit 232b-1, a frame generation unit 235b-1, a radio transmission unit 236b-1, an antenna unit 237b-1, and a radio reception unit 238b-1. Since the communication unit 23b-1 and a constituent apparatus thereof have functions similar to those of the communication unit 23a-1 and a corresponding constituent apparatus, description thereof will be omitted.

Figure 4:
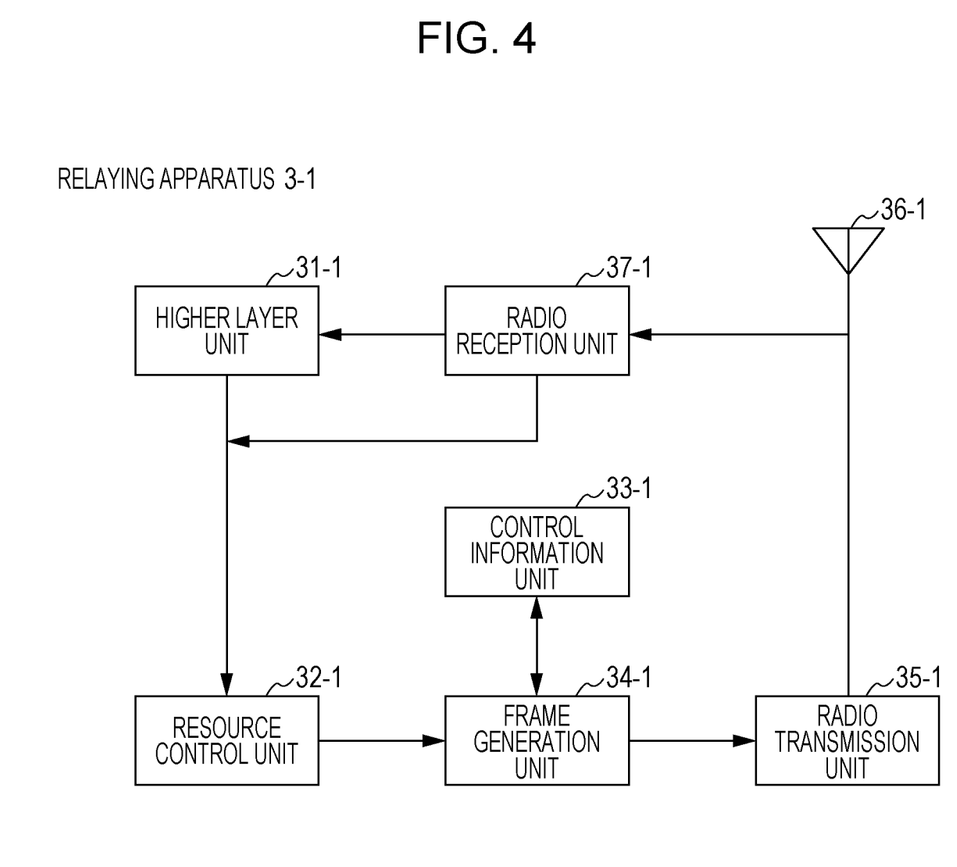
FIG. 4 illustrates an example of an apparatus configuration of a relaying apparatus according to an aspect of the invention.

FIG. 4 illustrates an example of an apparatus configuration of the relaying apparatus 3-1. The relaying apparatus 3-1 is configured to include a part or all of a higher layer unit 31-1, a resource control unit 32-1, a control information unit 33-1, a frame generation unit 34-1, a radio transmission unit 35-1, an antenna unit 36-1, and a radio reception unit 37-1.

The antenna unit 36-1 has an apparatus configuration similar to that of the antenna unit 237a-1 and has a function of notifying the radio reception unit 37-1 of a carrier wave signal that is received. The antenna unit 36-1 also has a function of transmitting, to a radio space, the carrier wave signal notified from the radio transmission unit 35-1.

The radio reception unit 37-1 has a function of generating a physical layer frame from the carrier wave signal. The radio reception unit 37-1 also has a function of acquiring information from the physical layer frame and notifying the higher layer unit 31-1 or the resource control unit 32-1 of the information (for example, information about a communication method, communication method information, entire information included in the physical layer frame (hereinafter, referred to also as reception information), or the like). Processing performed by the radio reception unit 37-1 includes frequency conversion processing, filtering, analog-digital conversion, or the like.

Since the higher layer unit 31-1 has a function similar to that of the higher layer unit 231a-1 of the remote-controlled apparatus 2a-1, description thereof will be omitted.

The resource control unit 32-1 has a function of performing control of a radio resource. In a case of transmitting, to a radio space, information about a communication method, communication method information, reception information, control information, or other information so as to be addressed to another apparatus (for example, the remote-controlled apparatus 2a-1, the remote apparatus 2b-1, or the like), the resource control unit 32-1 allocates a radio resource to each information and generates resource allocation information. The resource control unit 32-1 has a function of notifying the frame generation unit 34-1 of the information about the communication method, the communication method information, the reception information, the control information, or other information, and resource control information.

The control information unit 33-1 has a function of generating control information. Detailed control information will be described later.

The frame generation unit 34-1 has a function of applying, on the basis of the communication method information, processing such as error correction coding, modulation, resource mapping, or precoding filter multiplication, to the information about the communication method, the communication method information, the reception information, the control information, or other information and generating a physical layer frame. The frame generation unit 34-1 has a function of notifying the radio transmission unit 35-1 of the physical layer frame and the communication method information.

Since the radio transmission unit 35-1 has a function similar to that of the radio transmission unit 236a-1 of the remote-controlled apparatus 2a-1, description thereof will be omitted.

The communication method selection unit 22b-1 of the remote apparatus 2b-1 has a function of selecting a communication method suitable for the system on the basis of one or both of the remote control information and the environment information. Suitableness for the system may mean that the remote apparatus 2b-1 is able to suitably receive the environment information transmitted from the remote-controlled apparatus 2a-1 and that the remote-controlled apparatus 2a-1 is able to suitably receive the remote information transmitted from the remote apparatus 2b-1.

The remote apparatus 2b-1 and the remote-controlled apparatus 2a-1 may have different requirement conditions to suitably receive the environment information and the remote information. For example, a requirement condition for the remote information may be performance related to low-delay (latency) and a requirement condition for the environment information may be performance related to large-capacity transmission.

Figure 5:
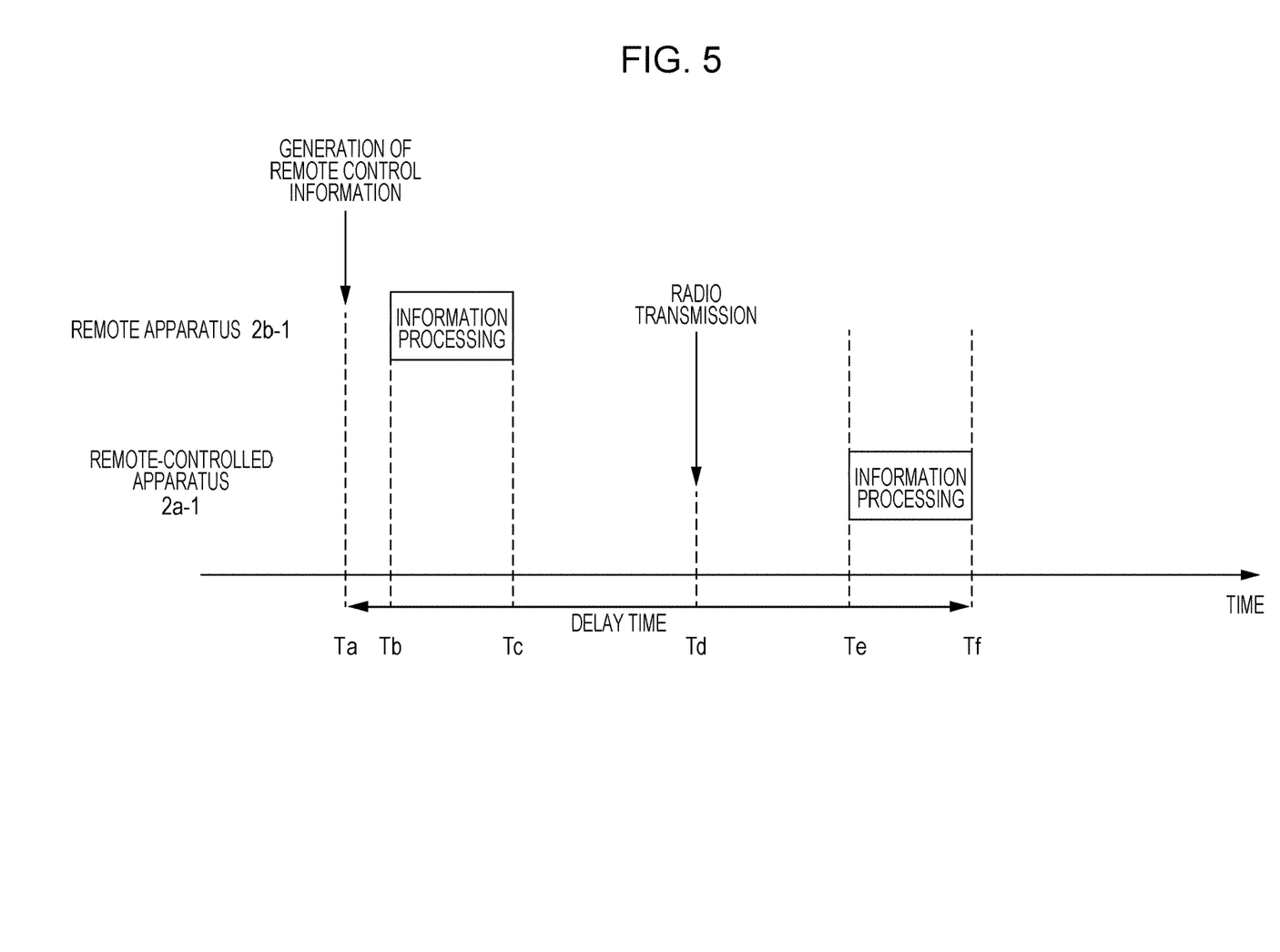
FIG. 5 illustrates an example of occurrence of delay when the remote apparatus transmits remote information to the remote-controlled apparatus according to an aspect of the invention.

FIG. 5 illustrates an example of occurrence of delay when the remote apparatus 2b-1 transmits remote information to the remote-controlled apparatus 2a-1. In the remote apparatus 2b-1, remote control information is generated at a time Ta. After the remote control information is generated, the remote apparatus 2b-1 starts information processing at a time Tb and ends the information processing at a time Tc. The information processing performed by the remote apparatus 2b-1 includes selection of a communication method performed by the communication method selection unit 22b-1 of the remote apparatus 2b-1, control of a radio resource performed by the communication unit 23b-1, generation of a physical layer frame, and the like. Next, the remote apparatus 2b-1 transmits a carrier wave signal to the remote-controlled apparatus 2a-1 at a time Td, and the remote-controlled apparatus 2a-1 receives the carrier wave signal. After that, the remote-controlled apparatus 2a-1 starts information processing at a time Te and ends the information processing at a time Tf. The information processing performed by the remote-controlled apparatus 2a-1 includes generation of a physical layer frame performed by the communication unit 23a-1 of the remote-controlled apparatus 2a-1, and extraction of remote control information.

A difference between any two times of the times Ta, Tb, Tc, Td, Te, and Tf is able to be defined as delay. That is, since the requirement condition related to delay suitable for the system varies depending on an assumed system, the delay may be a time difference |Tf−Ta| between Ta and Tf or a time difference |Te−Tc| between Tc and Te, for example.

Figure 6:
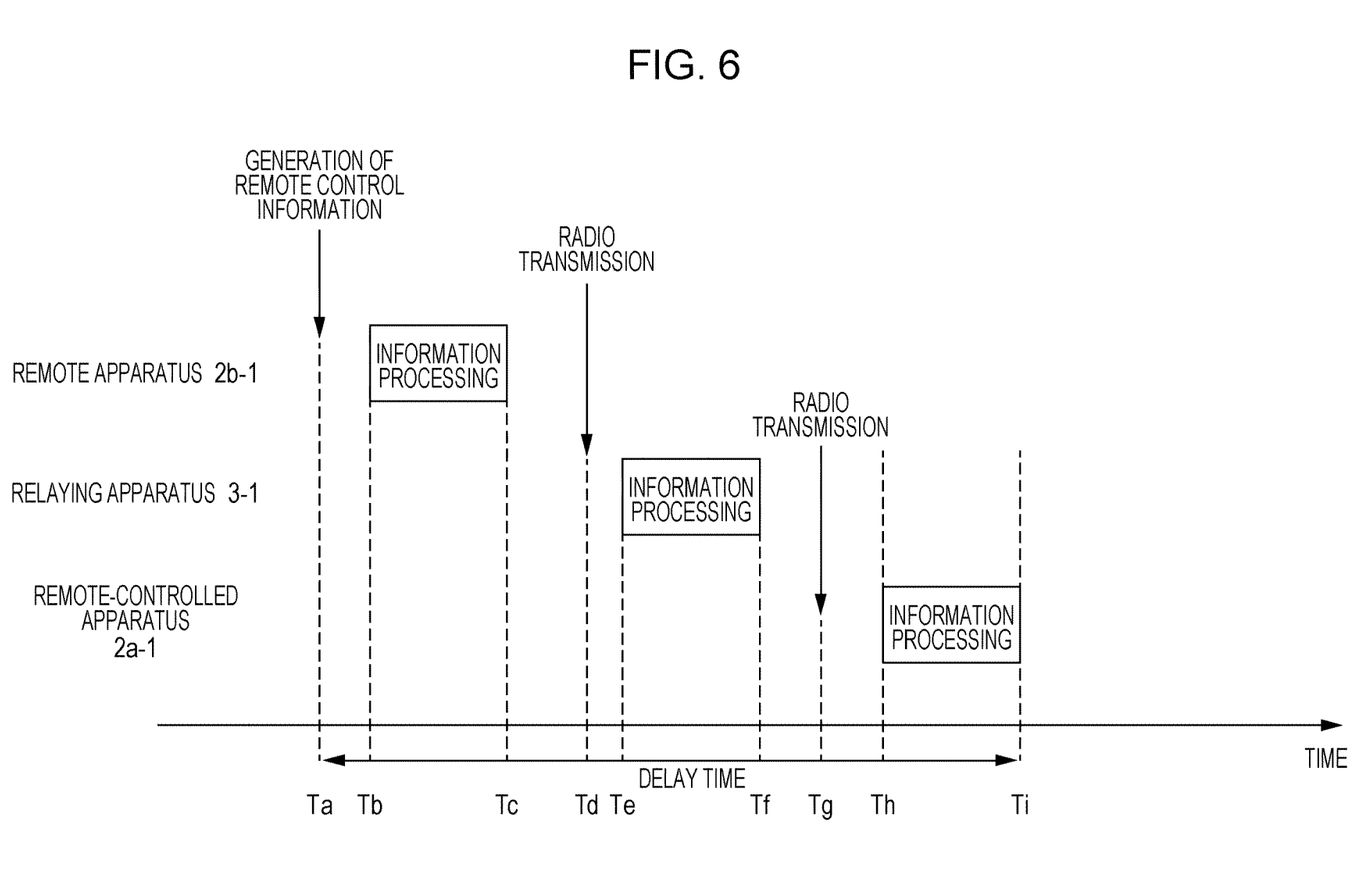
FIG. 6 illustrates an example of occurrence of delay when the remote apparatus transmits remote information to the remote-controlled apparatus via the relaying apparatus according to an aspect of the invention.

FIG. 6 illustrates an example of occurrence of delay when the remote apparatus 2b-1 transmits remote information to the remote-controlled apparatus 2a-1 via the relaying apparatus 3-1. In the remote apparatus 2b-1, remote control information is generated at a time Ta. The remote apparatus 2b-1 starts information processing at a time Tb and ends the information processing at a time Tc. Next, the remote apparatus 2b-1 transmits a carrier wave signal to a radio space at a time Td and the relaying apparatus 3-1 receives the carrier wave signal. After that, the relaying apparatus 3-1 starts information processing at a time Te and ends the information processing at a time Tf. The information processing performed by the relaying apparatus includes generation of a physical layer frame performed by the radio reception unit 37-1 of the relaying apparatus 3-1, transmission standby performed by the higher layer unit 31-1, control of a radio resource performed by the resource control unit 32-1, generation of a physical layer frame performed by the frame generation unit 34-1, and the like. Subsequently, the relaying apparatus 3-1 transmits a carrier wave signal to a radio space at a time Tg and the remote-controlled apparatus 2a-1 receives the carrier wave signal. Then, the remote-controlled apparatus 2a-1 starts information processing at a time Th and ends the information processing at a time Ti.

A difference between any two times of the times Ta, Tb, Tc, Td, Te, Tf, Tg, Th, and Ti is able to be defined as delay. That is, since the requirement condition related to delay suitable for the system varies depending on an assumed system, the delay may be a time difference |Tf−Ta| between Ta and Tf or a time difference |Te−Tc| between Tc and Te, for example.

It is possible to understand that the requirement related to delay is that a delay TL satisfies the requirement condition related to delay, TL<R. Note that, it is a required value related to delay.

It is suitable for the system to transmit the remote information from the remote apparatus 2b-1 to the remote-controlled apparatus 2a-1 so that the requirement condition related to delay, TL<R is satisfied. The communication method selection unit 22b-1 of the remote apparatus 2b-1 has a function of selecting a communication method in accordance with the requirement condition related to delay. Note that, description will be given below by assuming that delay TL=Tf−Ta is set in a case of direct communication and TL=Ti−Ta is set in a case of relaying communication, for example.

Figure 7:
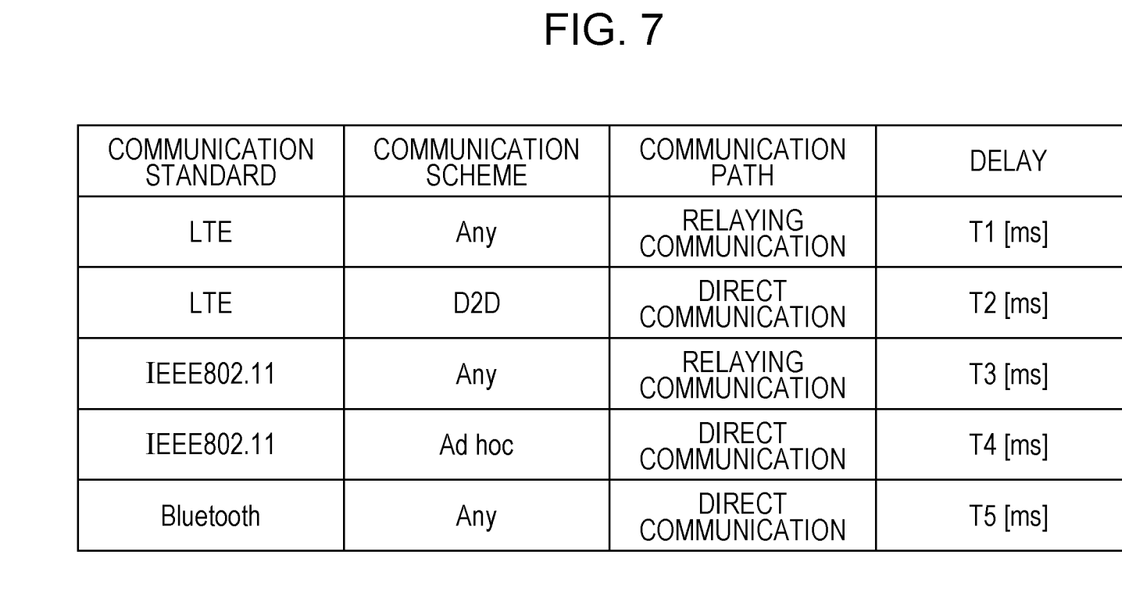
FIG. 7 illustrates an example of a relationship between each of communication methods and delay according to an aspect of the invention.

FIG. 7 illustrates an example of a relationship between each of communication methods and delay. The communication method has different delay in accordance with a communication standard, a communication scheme, and a communication path. For example, in a case where the LTE is used as the communication standard and the communication path is relaying communication, the delay is T1 [ms]. Here, when Any is indicated as the communication scheme, it means that the communication scheme is not limited. In a case where the LTE is used as the communication standard and the communication scheme is D2D, the communication path is direct communication and the delay is T2 [ms]. The communication method selection unit 22b-1 is able to select a communication method suitable for the system on the basis of the requirement condition of the remote control information.

The communication method selection unit 22b-1 is able to generate communication selection instruction information that is used to assist or instruct the communication method selection unit 22a-1 of the remote-controlled apparatus 2a-1 to select a communication method.

The communication selection instruction information will be described. The remote apparatus 2b-1 is able to use the communication selection instruction information to cause the remote-controlled apparatus 2b-1 to select a communication method different from the communication method selected by the remote apparatus 2b-1. When the remote apparatus 2b-1 and the remote-controlled apparatus 2a-1 select the same communication method, performance of delay, a communication capacity, or the like is deteriorated due to collision of radio resources, for example, so that a communication method suitable for the system may not be selected. Thus, with use of the communication selection instruction information, it is possible to assist or instruct the remote-controlled apparatus 2a-1 to select a communication method so that a communication method suitable for the system is selected.

The communication method selection unit 22a-1 of the remote-controlled apparatus 2a-1 has a function of selecting a communication method on the basis of information about the amount of the environment information, information about properties of the environment information, the communication selection instruction information, or the like.

A requirement for large-capacity communication is able to be considered as a requirement related to an amount obtained by averaging the amount of communication information in a time. That is, it may be considered that the requirement for large-capacity communication is that an information amount IA that is obtained by performing averaging in all or a part of the time during which communication is performed and the requirement condition TR satisfy IA>TR.

A case where the requirement condition related to delay is set to remote information and the requirement condition related to large-capacity communication is set to environment information will be described below, for example.

In an aspect of the present embodiment, each of the remote-controlled apparatus 2a-1 and the remote apparatus 2b-1 complies with the standard defined by the 3GPP and the relaying apparatus has a function of a base station apparatus. Since the requirement condition related to delay is set to the remote information, the requirement condition related to delay is set to the remote apparatus 2b-1, so that the communication method selection unit 22b-1 selects the direct communication 4a-1. As the standard defined by the 3GPP, there is a standard by which D2D (Prose, line-of-sight communication, direct communication, Sidelink) is realized. With use of a broadcast signal (SIB (System Information Base), MIB (Master Information Base), or the like) or RRC (Radio Resource Control) signaling, a base station apparatus 3-1 notifies the remote apparatus 2b-1 of information about a resource that may be used for D2D communication. For example, the information about a resource that may be used for D2D communication is able to be set on the basis of a frequency or a time resource. The information about a resource that may be used for D2D communication is also referred to as a resource pool (radio resource candidate information) or the like.

On the basis of the resource pool, the remote apparatus 2b-1 decides a radio resource used for the direct communication 4a-1. As a method for deciding the radio resource used for the direct communication 4a-1 by the remote apparatus 2b-1, there are two methods of a method (an autonomous decision method, a contention method, Contention base, Contention, Transmission mode 2 (TM2), or the like) for making decision in an autonomous and distributed manner and a method (an allocation method, a scheduling method, Transmission mode 1, or the like) allocated by an apparatus that has the function of a base station apparatus.

The remote apparatus 2b-1 has an autonomous decision method for autonomously selecting a radio resource on the basis of the resource pool. With the autonomous decision method, the radio resource is able to be reserved immediately after the remote information is generated, and therefore it is assumed that the requirement condition related to delay is suitably satisfied. On the other hand, in a case where an apparatus other than the remote apparatus 2b-1 selects the same radio resource, radio resource collision or the like may occur. Note that, the remote apparatus 2b-1 is also able to carry out the autonomous decision method without using the resource pool.

The remote apparatus 2b-1 is able to acquire a radio resource by an allocation method. The remote apparatus 2b-1 transmits, to an apparatus (for example, the relaying apparatus 3-1) that has the function of a base station apparatus, a signal to request allocation of a radio resource (Scheduling Request (SR) or the like). As radio resource allocation information, the apparatus that has the function of a base station apparatus transmits, to the remote apparatus 2b-1, a PDCCH (Physical Downlink Control Channel) or ePDCCH each of which is a physical channel by a format according to DCI format 5 or other formats. The remote apparatus 2b-1 receives the PDCCH or ePDCCH as the format according to DCI format 5 or other formats and acquires the radio resource allocation information. The allocation method may cause delay due to exchange of control information associated with scheduling, but is suitable for the system because there is no collision of radio resources with respect to an apparatus other than the remote apparatus 2b-1.

The remote apparatus 2b-1 that has acquired the radio resource carries out the direct communication 4a-1. Through the direct communication 4a-1, the remote apparatus 2b-1 transmits PSSCH (Physical Sidelink Shared Channel) including the remote information. Note that, the remote apparatus 2b-1 may include communication method instruction information in the PSSCH. The communication method instruction information may be included in PSCCH (Physical Sidelink Control Channel). The PSCCH is a channel on which control information for D2D communication is transmitted.

The communication method instruction information generated by the remote apparatus 2b-1 is suitably information for instructing the remote-controlled apparatus 2a-1 not to perform D2D communication. The communication method instruction information makes it possible to prevent the remote apparatus 2b-1 and the remote-controlled apparatus 2a-1 from selecting the same radio resource in D2D and prevent deterioration of performance of communication by division of a radio resource.

The remote-controlled apparatus 2a-1 receives the PSSCH transmitted by the remote apparatus 2b-1 and acquires remote information.

The remote-controlled apparatus 2a-1 transmits the environment information to the remote apparatus 2b-1. Since the requirement condition related to large-capacity communication is set to the environment information, not the direct communication 4b-1 but the relaying communication 5b-1 and the relaying communication 6b-1 may be suitably used.

First, the remote-controlled apparats 2a-1 transmits an SR to the relaying apparatus 3-1 by using the relaying communication 5a-1. Next, the relaying apparatus 3-1 transmits the PDCCH by a format according to a specific DCI format by using the relaying communication 5a-1. The remote-controlled apparatus 2a-1 receives the PDCCH and acquires radio resource allocation information. The remote-controlled apparatus 2a-1 then uses a radio resource that is allocated through the relaying communication 5a-1 and transmits PUSCH (Physical Uplink Shared Channel) that includes environment information to the relaying apparatus 3-1.

The relaying apparatus 3-1 receives the PDSCH including the environment information. Subsequently, the relaying apparatus 3-1 generates PDSCH (Physical Downlink Shared Channel) that includes the environment information. The relaying apparatus 3-1 also generates PDCCH that includes information for notifying the radio resource by which the PDSCH is transmitted and transmits the PDCCH and the PDSCH.

The remote apparatus 2a-1 acquires the radio resource allocation information included in the PDCCH, receives the PDCCH on the basis of the radio resource allocation information, and acquires the environment information. As indicated above, the remote information is communicated through the direct communication 4a-1 and the environment information is communicated through the relaying communications 5b-1 and 6b-1, so that the remote information is able to suitably satisfy the requirement condition related to delay and the environment information is able to suitably satisfy the requirement related to large-capacity communication.

Figure 8:
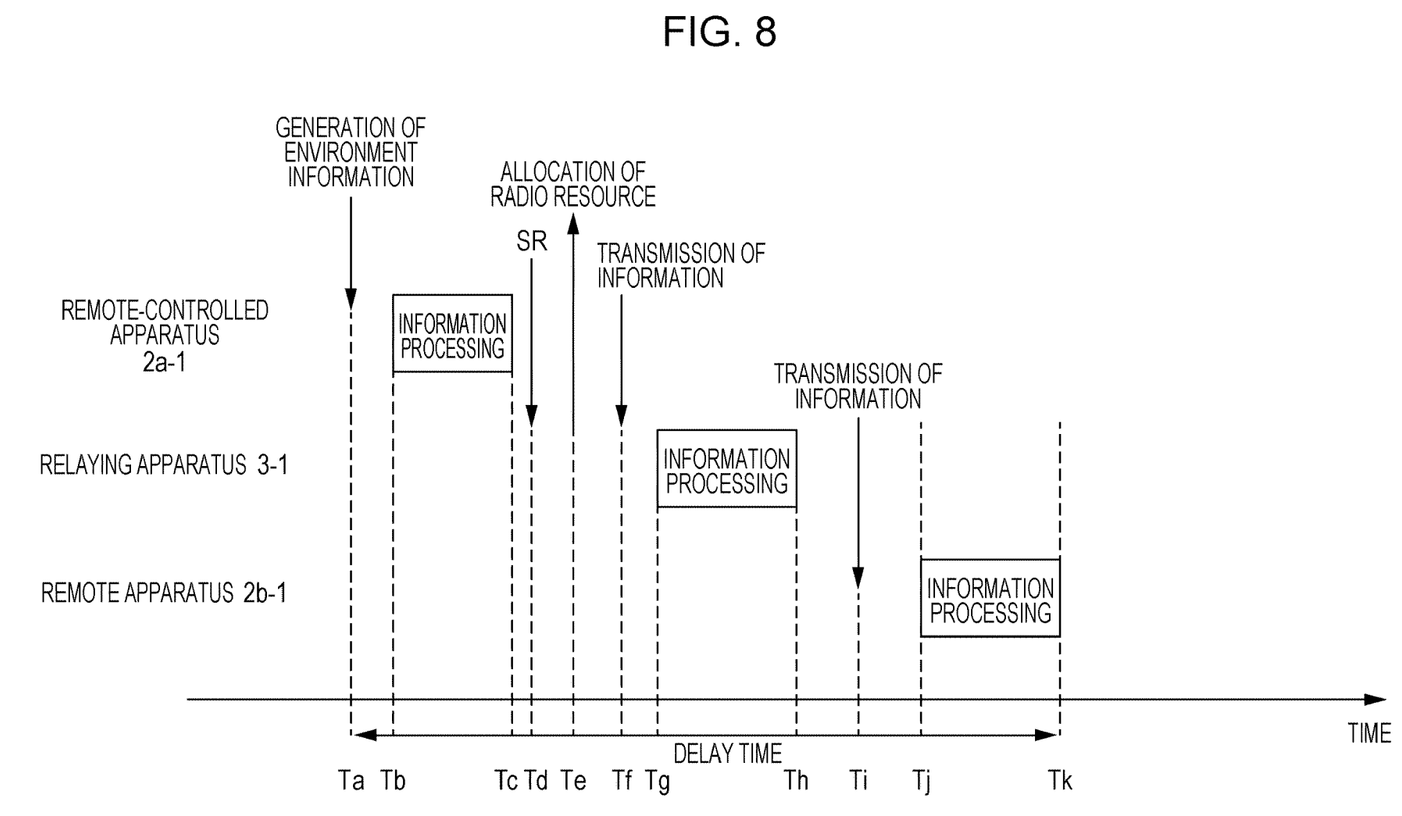
FIG. 8 illustrates an example of occurrence of delay when the remote-controlled apparatus transmits remote information to the remote-controlled apparatus via the relaying apparatus according to an aspect of the invention.

FIG. 8 illustrates an example of occurrence of delay when the remote-controlled apparatus 2a-1 transmits remote information to the remote-controlled apparatus 2b-1 via the relaying apparatus 3-1. First, in the remote-controlled apparatus 2a-1, environment information is generated at a time Ta, information processing starts at a time Tb, and the information processing ends at a time Tc. Next, the remote-controlled apparatus 2a-1 transmits control information (for example, SR) to the relaying apparatus 3-1 at a time Td, and the relaying apparatus 3-1 receives the control information.

The relaying apparatus 3-1 then transmits control information (for example, radio resource allocation information or the like) to the remote-controlled apparatus 2a-1 at a time Te and the remote-controlled apparatus 2a-1 receives the control information. Next, the remote-controlled apparatus 2a-1 transmits environment information at a time Tf on the basis of the radio resource allocation information and the relaying apparatus 3-1 receives the environment information. The relaying apparatus 3-1 then starts information processing for information that includes the environment information at a time Tg and ends the information processing at a time Th. Subsequently, the relaying apparatus 3-1 transmits the environment information to the remote apparatus 2b-1 at a time Ti and the remote apparatus 2b-1 receives the environment information. The remote apparatus 2b-1 starts information processing for information that includes the environment information at a time Tj and ends the information processing at a time Tk.

A difference between any two times of the times Ta, Tb, Tc, Td, Te, Tf, Tg, Th, Ti, Tj, and Tk is able to be defined as delay. That is, since the requirement condition related to delay suitable for the system varies depending on an assumed system, the delay may be a time difference |Tf−Ta| between Ta and Tf or a time difference |Te−Tc| between Tc and Te, for example.

In another aspect of the present embodiment, each of the remote-controlled apparatus 2a-1 and the remote apparatus 2b-1 complies with the standard defined by the 3GPP and the relaying apparatus has the function of a base station apparatus, and further, the remote-controlled apparatus 2a-1 and the remote apparatus 2b-1 are able to perform a communication method complying with radio communication standard, such as wireless LAN or Bluetooth (registered trademark), other than the standard defined by the 3GPP in the direct communication 4a-1 and the direct communication 4b-1, respectively.

Figure 9:
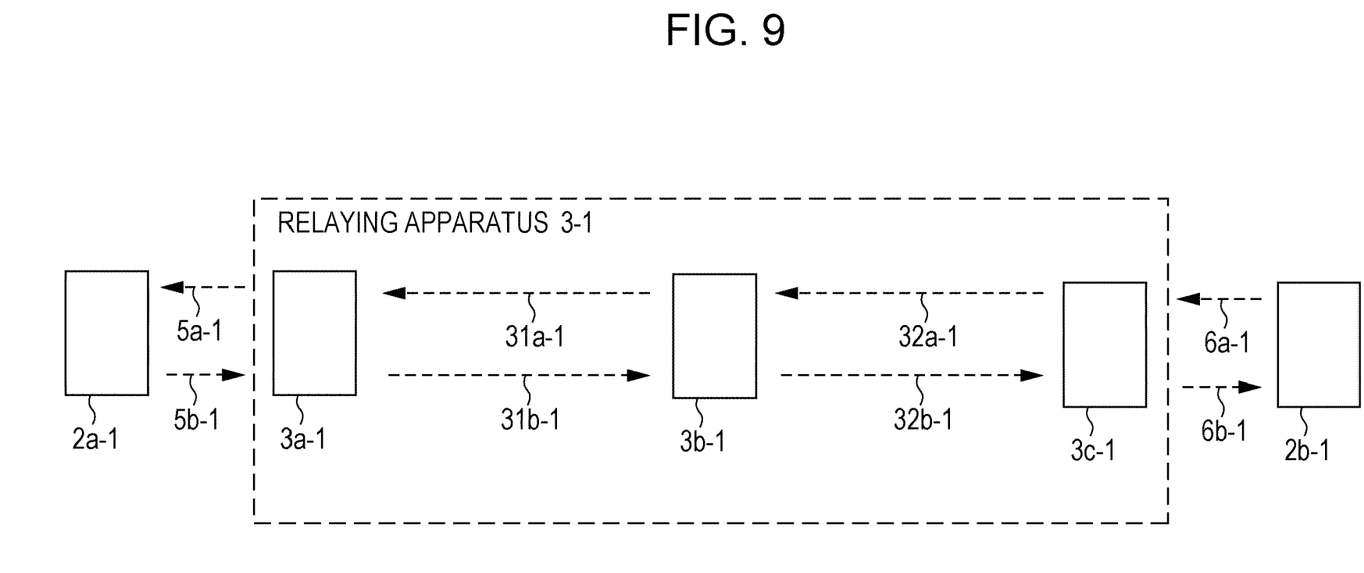
FIG. 9 illustrates an example of a configuration of a relaying apparatus according to an aspect of the invention.

In another aspect of the present embodiment, the relaying apparatus 3-1 is constituted by a plurality of relay apparatuses. FIG. 9 illustrates an example of a configuration of the relaying apparatus 3-1. The relaying apparatus 3-1 is configured to include a relay apparatus 3a-1, a relay apparatus 3b-1, and a relay apparatus 3c-1. Note that, the configuration of the relaying apparatus 3-1 is not limited to FIG. 9 and the relaying apparatus 3-1 is able to be constituted by one or more relay apparatuses. The relay apparatus 3a-1, the relay apparatus 3b-1, and the relay apparatus 3c-1 are collectively referred to also as a relay apparatus 30-1 or a relaying apparatus 3-1. The relay apparatuses are connected to each other by a relay communication 31a-1, a relay communication 31b-1, a relay communication 32a-1, and a relay communication 32b-1. The relay communication 31a-1 and the relay communication 31b-i are collectively referred to also as a relay communication 31-1, the relay communication 32a-1 and the relay communication 32b-1 are collectively referred to also as a relay communication 32-1, and the relay communication 31a-1, the relay communication 31b-1, the relay communication 32a-1, and the relay communication 32b-1 are collectively referred to also as a relay communication 300-1.

Note that, a part or all of the relay communication 300-1 may be wired communication or wireless communication. For example, the relay apparatus 30-1 may be an RRH (Remote Radio Head). The relay apparatus 30-1 may form a distributed antenna system. For example, only the relay apparatus 3b-1 may be a digital signal processing apparatus (a baseband unit, a baseband processing apparatus, or a baseband signal processing apparatus).

The relay apparatus 30-1 may be constituted by a small cell. A part of the relay apparatus 30-1 may be constituted by a small cell and the other part of the relay apparatus 30-1 may be constituted by an RRH.

Next, a part of an example of service realized by the communication system 1-1 described in the present embodiment will be indicated. Note that, the example of the service realized by the communication system 1-1 is not limited to the following. It is obvious that the example indicated below is merely an example of the service.

In the example of the service realized by the communication system 1-1, the remote apparatus 2b-1 remotely controls the remote-controlled apparatus 2a-1. The remote apparatus 2b-1 is able to decide a transmission timing (time, time point, or the like) of remote information on the basis of environment information that is transmitted by the remote-controlled apparatus 2a-1 and acquired by the remote apparatus 2b-1. For example, in a case where the environment information is video image information, at a timing when a certain feature is extracted from the video image information (or at a timing delayed by a time period D from a timing when the extraction is performed, for example, and the time period D may be dynamically or statically variable or may be always a fixed value), the remote apparatus 2b-1 is able to start transmission or remote information is able to be generated. The remote information may be, for example, information (for example, but not limited to, information for stopping an operation of the information acquisition unit 21a-1) for controlling an operation of the information acquisition unit 21a-1 of the remote-controlled apparatus 2a-1, information for controlling an operation of the communication method selection unit 22a-1, information for controlling an operation of the communication unit 23a-1, or information for changing a kind (type or the like) of the environment information acquired by the information acquisition unit 21a-1. For example, in a case where the remote-controlled apparatus 21a-1 has acquired video image information as the environment information, at a timing when the remote information that includes information for changing a kind of the environment information acquired by the information acquisition unit 21a-1 to temperature information is received or a timing delayed by a time period D1 from a timing when remote information is received, acquisition of the temperature information is carried out. Note that, a method for extracting a feature amount is not limited. In other words, the remote apparatus 2b-1 is able to determine transmission of the remote information on the basis of the environment information that is acquired or a feature amount extracted from the environment information.

As another example of the service realized by the communication system 1-1, there is a method by which the remote apparatus 2b-1 transmits remote information that includes information for controlling an operation of another apparatus (for example, but not limited to, an apparatus that is allowed to communicate information with the remote-controlled apparatus 2a-1, a motor vehicle, a robot, a drone (unmanned air vehicle), a self-traveling cleaner, a personal computer, a display apparatus, lighting, or the like) that is able to be controlled by the remote-controlled apparatus 2a-1.

Note that, a method for extracting a feature of the environment information acquired by the remote apparatus 2b-1 is not limited.

[2. Common in all Embodiments]

A program which runs in the terminal apparatus 2a-1, the terminal apparatus 2b-1, and the relaying apparatus 3-1 according to an aspect of the invention is a program that controls a CPU and the like (program that causes a computer to function) such that the functions in the aforementioned embodiments concerning an aspect of the invention are realized. The pieces of information handled by the apparatuses are temporarily accumulated in a RAM during the processing thereof, and then stored in various ROMs and HDDs and read, corrected, and written by the CPU when necessary. A recording medium that stores the program therein may be any of a semiconductor medium (for example, a ROM, a nonvolatile memory card, or the like), an optical recording medium (for example, a DVD, an MO, an MD, a CD, a BD, or the like), a magnetic recording medium (for example, a magnetic tape, a flexible disc, or the like), and the like. Moreover, there is also a case where, by executing the loaded program, not only the functions of the aforementioned embodiments are realized, but also by performing processing in cooperation with an operating system, other application programs, or the like on the basis of an instruction of the program, the functions of an aspect of the invention are realized.

When being distributed in the market, the program is able to be stored in a portable recording medium and distributed or be transferred to a server computer connected through a network such as the Internet. In this case, a storage apparatus of the server computer is also included in an aspect of the invention. A part or all of the terminal apparatus 2a-1, the terminal apparatus 2b-1, and the relaying apparatus 3-1 in the aforementioned embodiments may be realized as an LSI which is a typical integrated circuit. Each functional block of the terminal apparatus 2a-1, the terminal apparatus 2b-1, and the relaying apparatus 3-1 may be individually formed into a chip, or a part or all thereof may be integrated and formed into a chip. When each functional block is made into an integrated circuit, an integrated circuit control unit for controlling them is added.

Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

Note that, the invention of the present application is not limited to the aforementioned embodiments. The terminal apparatus 2a-1, the terminal apparatus 2b-1, and the relaying apparatus 3-1 according to the invention of the present application are not limited to be applied to a mobile station apparatus, but, needless to say, are applicable to stationary or unmovable electronic equipment which is installed indoors or outdoors such as, for example, AV equipment, kitchen equipment, a cleaning/washing machine, air conditioning equipment, office equipment, an automatic vending machine, other domestic equipment, and the like.

As above, the embodiments of the invention have been described in detail with reference to drawings, but specific configurations are not limited to the embodiments, and a design and the like which are not departed from the main subject of the invention are also included in the scope of claims.

INDUSTRIAL APPLICABILITY

The invention is suitably used for a communication system, a terminal apparatus, and a communication method.

Note that, the present international application claims priority from Japanese Patent Application No. 2015-170060 filed on Aug. 31, 2015, and the entire contents of Japanese Patent Application No. 2015-170060 are hereby incorporated herein by reference.

REFERENCE SIGNS LIST 1-1 radio communication system
2a-1, 2b-1 terminal apparatus
3-1 relaying apparatus
3a-1, 3b-1, 3c-1 relay apparatus
31a-1, 31b-1, 32a-1, 32b-1 relay communication
4a-1, 4b-1 direct communication
5a-1, 5b-1, 6a-1, 6b-1 indirect communication
21a-1, 21b-1 information acquisition unit
22a-1, 22b-1 communication method selection unit
23a-1, 23b-1 communication unit
231a-1, 231b-1, 31-1 higher layer unit
232a-1, 232b-1 communication method application unit
233a-1, 233b-1, 32-1 resource control unit
234a-1, 234b-1, 33-1 control information unit
235a-1, 235b-1, 34-1 frame generation unit
236a-1, 236b-1, 35-1 radio transmission unit
237a-1, 237b-1, 36-1 antenna unit
238a-1, 238b-1, 37-1 radio reception unit

The invention claimed is:

1. A first terminal apparatus that communicates with a second terminal apparatus, the first terminal apparatus comprising:
a radio unit that transmits a first signal by using a first communication path that is a direct communication path to the second terminal apparatus,
the radio unit receives a second signal transmitted by using a second communication path different from the first communication path, wherein
the first signal is transmitted on a basis of a feature amount of the second signal, and
a required transmission rate of data transfer using the first communication path is smaller than a required transmission rate of data transfer using the second communication path.

2. The first terminal apparatus according to claim 1, wherein
a frequency resource used for the second communication path is allocated by transmitting a scheduling request.

3. The first terminal apparatus according to claim 1, wherein
a required transmission delay amount of data transfer using the first communication path is smaller than a required transmission delay amount of data transfer using the second communication path.

4. The first terminal apparatus according to claim 1, wherein
a frequency resource used for the first communication path is allocated in advance.

5. A first terminal apparatus that communicates with a second terminal apparatus, the first terminal apparatus comprising:
a radio unit that transmits a first signal by using a first communication path that is a direct communication path to the second terminal apparatus,
the radio unit receives a second signal transmitted by using a second communication path different from the first communication path, wherein
the first signal is transmitted on a basis of a feature amount of the second signal, and
a required transmission delay amount of data transfer using the first communication path is smaller than a required transmission delay amount of data transfer using the second communication path.

6. The first terminal apparatus according to claim 5, wherein
a required transmission rate of data transfer using the first communication path is smaller than a required transmission rate of data transfer using the second communication path.

7. A first terminal apparatus that communicates with a second terminal apparatus, the first terminal apparatus comprising:
a radio unit that transmits a first signal by using a first communication path that is a direct communication path to the second terminal apparatus, the radio unit receives a second signal transmitted by
using a second communication path different from the
first communication path, wherein
the first signal is transmitted on a basis of a feature
amount of the second signal, and
a frequency resource used for the first communication
path is allocated in advance.

\* \* \* \* \*